Figure 1:
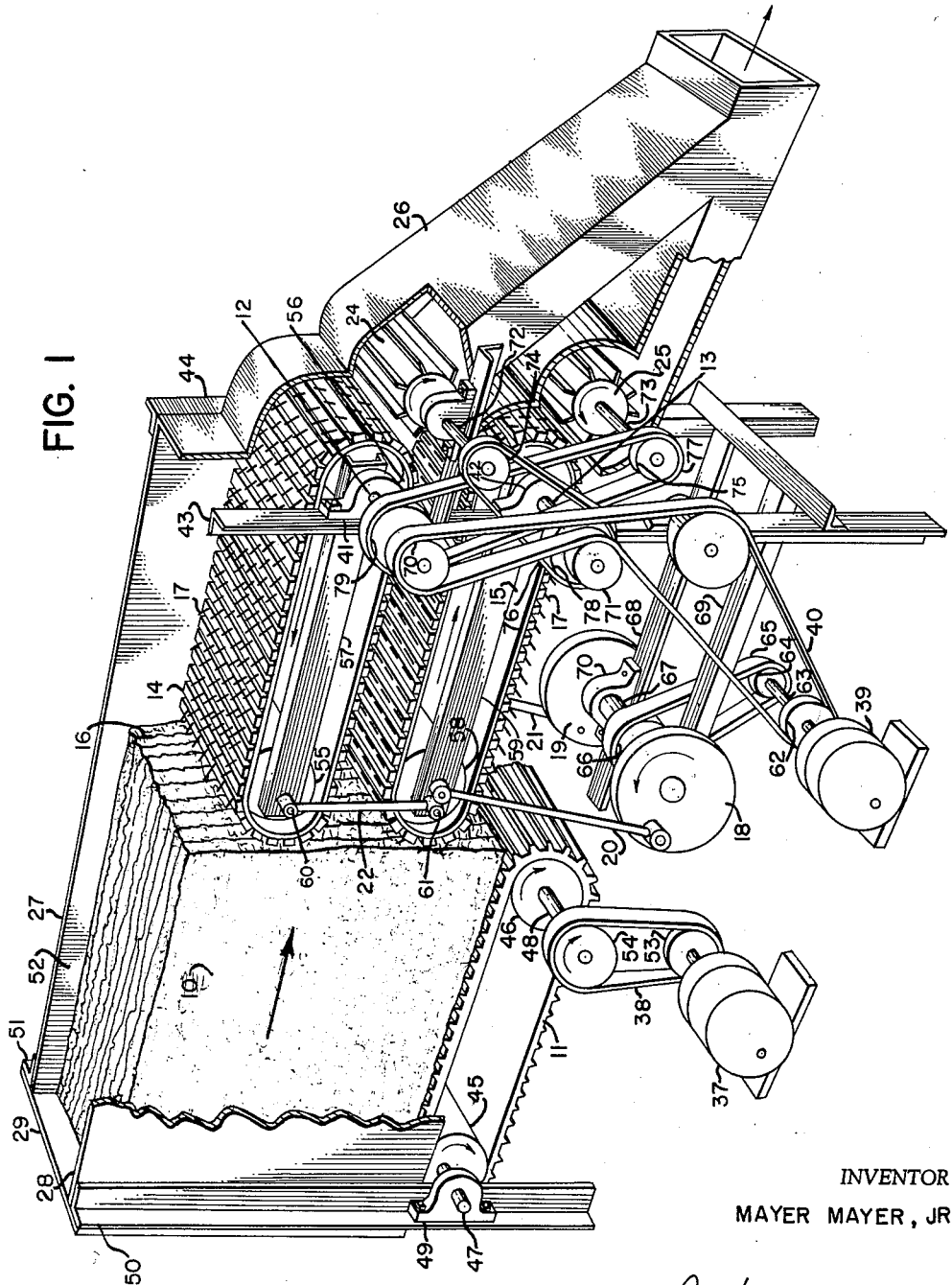

Jan. 26, 1965  M. MAYER, JR  3,166,797
FIBER BALE OPENER AND BLENDER
Filed Sept. 18, 1962  2 Sheets-Sheet 1

INVENTOR
MAYER MAYER, JR.

BY
R. Hoffman
ATTORNEY

3,166,797
FIBER BALE OPENER AND BLENDER
Mayer Mayer, Jr., New Orleans, La., assignor to the United States of America as represented by the Secretary of Agriculture
Filed Sept. 18, 1962, Ser. No. 224,905
3 Claims. (Cl. 19—81)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to an apparatus for opening and blending textile fibers from single or from composite bales.

Heretofore, the opening and blending of baled fibers has required the use of multiple machines each fed a portion of one or more bales. Within each individual machine, the mat of fibers was torn apart and delivered to a separate mixing or blending apparatus.

Prior to my invention, no practical machine existed for opening fibers directly from several bales and simultaneously blending the fiber from the several bales all within a single machine.

It is the object of this invention to provide a single machine that will open and blend cotton from a single bale or from a composite or sandwich type bale made from as many bales as desired.

The machine that is the subject of this invention will consistently remove an equal portion of cotton in the form of plucked tufts from each bale segment of a composite bale and thoroughly blend the removed portions. Furthermore, it is possible to obtain with my machine a uniform tuft size and to control the size of the tuft. My machine provides continuous and uninterrupted opening and blending from within a single bale and from one bale to the subsequently following bales, be they single or multiple type bales.

In general, in accordance with the present invention, the bale opener and blender comprises a conveyor and attendant drive means for moving baled fiber in a unidirectional straight linear path. Opposing the movement of the bale, is at least one roll-supported, endless, spiked belt. In a preferred form the machine is provided with two such belts mounted on suitable rigid supporting means, as will be described in detail below. The belts are so mounted that a first roll-supported end of each belt is in contact with the forward end or face of the bale and the surfaces of the belts travel either toward or away from the bale in the same general longitudinal direction as that in which the bale travels. This first end of the belt is referred to as the proximal end. The roll-supported ends of the belts which are distal the bale are each mounted for rotation about shafts journalled to the frame of the machine, the shafts extending in a direction transverse to the direction of travel of the bale and the belts, while the proximal ends of the belts in contact with the bale are free to oscillate across the forward face of the latter. Oscillation is achieved by means of a combination of cranks or connecting rods suitably connected to eccentric driving means, as will also be described in detail below. The result of the just-described construction is to provide one or more endless belts pivotally mounted at the supporting end distant from the bale while the supporting end adjacent the bale oscillates in a curved path across the face thereof. The amplitude of oscillation is such that the oscillating ends each traverse a portion of the bale so that the sum of the portions equals the entire area of the face of the bale. Thus, in the preferred form of the invention in which two belts are used, each belt transverses at least half the area. The spikes are inclined in the direction of travel of the belts so that, as the conveying means presses the bale against the oscillating ends of the belts, the spikes pluck tufts of fiber from the bale and carry them forward to the pivotally mounted ends of the belts. At the forward end, the tufts are removed from the spikes by suitable doffing means.

I advantageously made use of the fixed pivotal mounting to allow application of any simple fixed position fiber doffing system and also to permit use of conventional drives for both the doffer and the continuously moving endless spiked belt.

Figure 2:
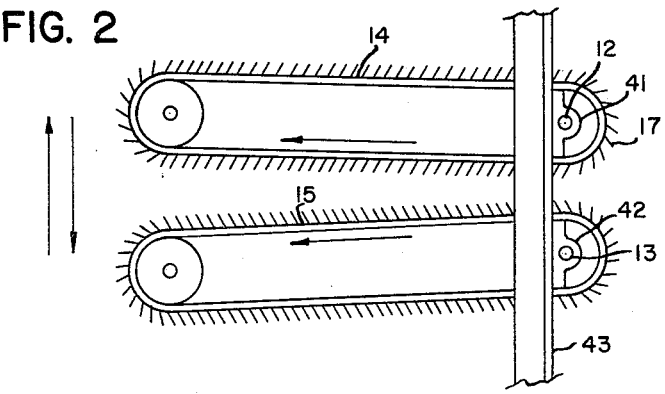
Figure 3:
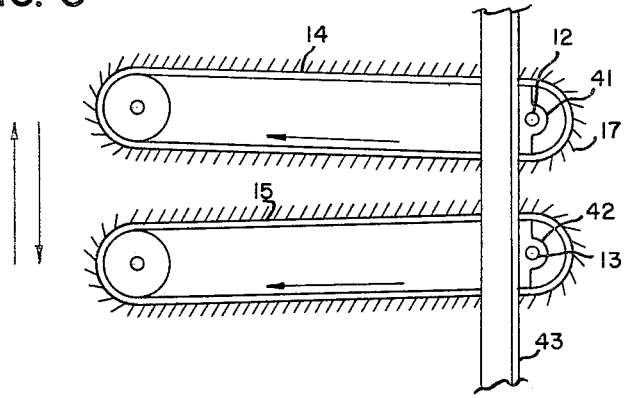
Figure 4:
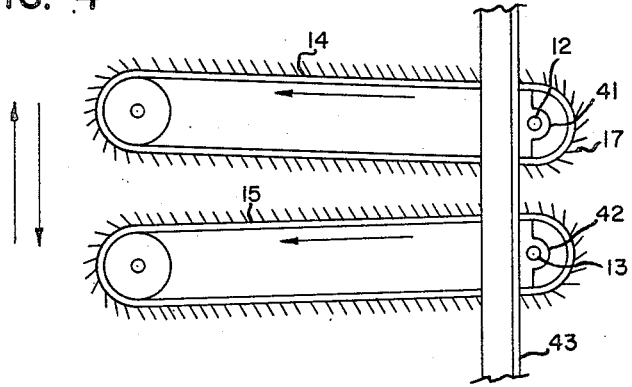

In order that the invention may be better understood, there follows a description of the preferred form, reference being made to the accompanying drawings in which:

FIGURE 1 is a three-dimensional representation of the assembled machine with portions cut away to show its structure and operation, and FIGURES 2, 3, and 4 are schematic representations of alternative arrangements of the spiked belts.

Referring to FIGURE 1, it is seen that the machine comprises a plurality of vertical support members or posts 43, 44, 50, and 51, forming a framework to which are secured, by any suitable means, side wall members 27 and 28 and rear wall member 29. These wall members form an open-bottom chamber or space 52 into which a bale, or sandwich type bale, 10 may be inserted by any suitable means (not shown). The three wall members serve to confine bale 10 and limit it to movement only in a forward direction. At the bottom of chamber 52 there is provided an endless conveyor 11 supported on rollers 45 and 46 which are mounted for rotation about shafts 47 and 48, respectively. Shafts 47 and 48 extend transverse to chamber 52 and are journalled in a known manner to the framework by means of four bearings, only one of which, 49, can be seen mounted on support member 50. Bale 10 is carried forward by conveyor 11 which is driven by means of motor 37 through pulleys 53 and 54 and belt 38. Conveyor 11 may be driven either at a continuous or intermittent rate or with a constant force. Means for controlling the motion are within the skill of the art and are not shown.

Opposing the forward movement of bale 10 are two stacked endless, spiked belts 14 and 15, disposed in the general direction of the longitudinal motion of the bale. These belts, as will be apparent from FIGURE 1, are of the same width as the width of the bale. Belt 14 is supported on rollers 55 and 56, while belt 15 is similarly supported on a pair of rollers, only one of which, 58, is visible. Each belt assembly comprises a pair of rigid parallel, longitudinally extending beam members which serve as means for supporting and carrying the belt-supporting rollers. Thus, as already indicated, belt 14 is supported by and travels over rollers 55 and 56 which are mounted for rotation about shafts 60 and 12, respectively, which are journalled in beam 57 and in the invisible parallel beam on the opposite side of the assembly. Similarly, belt 15 is supported by and travels over rear roller 58 and a forward roller, not shown. The rollers are mounted for rotation about shafts 61 and 13, respectively, which are journalled in beam member 59 and in the corresponding invisible parallel beam on the opposite side of the assembly. Shafts 12 and 13, at the forward or distal ends of the assemblies, are journaled in bearings 41 and 42, respectively, mounted on vertical support member 43 and in corresponding bearings (not shown) mounted on vertical support member 44. In this manner, the forward end of each belt assembly is fixed vertically but is free to pivot about shafts 12 and 13 as centers.

The rearward or proximal end of each belt assembly is not fixed vertically, but is free to oscillate in a generally vertical curved path across the forward face 16 of bale 10, shafts 12 and 13 serving as the respective pivotal axes as stated above. The oscillating motion is obtained in a conventional manner known to the art by means of eccentrics 18 and 19 which are connected to beam members 57 and 59 through connecting rods 20, 21, 22, and a fourth connecting rod on the far side of the machine (not shown). Eccentrics 18 and 19 are mounted for rotation on shaft 67 which is horizontally journalled in bearing 70, mounted on frame member 68 and in an invisible bearing mounted on frame member 69. The eccentrics are driven by means of belt 65 and motor 39 through pulleys 64 on motor shaft 63 and pulley 66 on shaft 67. The belts 14 and 15 are themselves driven by means of motor 39 through belt 40 operating about pulleys 70 and 71 on shafts 12 and 13, respectively. Each of belts 14 and 15 is provided with a plurality of spikes 17 which are inclined toward the face 16 of bale 10 in the direction of motion of belts 14 and 15. The amplitude of oscillation of the ends of the latter belts is such that each belt will traverse a sufficient portion, i.e., at least one half, of the face of the bale so that the entire face of the bale is traversed by the combined movement of both belts. The combined oscillating and endless belt motions result in the plucking of equal quantities of uniform size tufts from the bale. The force with which the bale is fed into the oscillating-spiked belts directly controls the size of the tufts and the rate of opening and blending. The fiber is doffed from the spiked belts at the pivot end of the belts by any suitable method such as leather flap rolls 24 and 25 or by air suction or air blowing means, not shown, and conveyed through duct 26 to the succeeding operation by a conventional duct system, also not shown. By pivotally mounting the forward or distal ends of the spiked belt assemblies in the manner described, it is possible to take advantage of motor 39 to also drive doffing rolls 24 and 25. Thus, doffing roll shafts 72 and 73 are provided with pulleys 74 and 75. Pulley 74 is driven by means of belt 76 from pulley 78 on shaft 13, while pulley 75 is driven by means of belt 77 from pulley 79 on shaft 12.

Whereas the direction of travel of the spiked belts and the inclination of the spikes shown in FIGURE 1 is the preferred arrangement, the successful performance of this invention is not so limited. Alternate arrangements are seen in FIGURES 2, 3, and 4. In FIGURE 2 the inclination of the spikes 17 and the direction of travel of the belts are such as to result in a force on the bale away from the center. In FIGURE 3 the spike inclination 17 and the direction of travel of the belts are such as to result in an upward force on the bale from each belt. In FIGURE 4 the spike inclination 17 and the direction of travel of the belts are such as to result in a downward force on the bale from each belt.

I claim:

1. A machine for opening and blending baled fiber comprising:
    (a) a plurality of support members forming a framework;
    (b) a conveyor mounted on said framework for moving a bale of fiber in a unidirectional straight linear path;
    (c) conveyor driving means connected to said conveyor;
    (d) a first pair of elongated, rigid support members longitudinally disposed in the path of movement of the bale, a first end of each rigid support member being proximal to the forward end of the bale and a second end of each rigid support member being distal to said bale;
    (e) a second pair of elongated, rigid support members, parallel to said first pair, and disposed above said first pair;
    (f) a roller at each end of each pair of rigid support members rotatably mounted thereon transverse to the path of movement of the bale;
    (g) an endless belt supported for continuous movement over the rollers mounted at the ends of each of said pair of rigid support members, thereby forming a pair of stacked endless belts longitudinally disposed in the path of movement of the bale, the end of each belt proximal to the face of the bale being in contact with and opposing the forward movement thereof;
    (h) a plurality of spikes secured to the surface of each belt adapted to pluck portions of fiber from the face of the bale;
    (i) means for pivotally and rotatably mounting each distal roller to the framework transverse to the direction of movement of the bale;
    (j) means connected to each proximal roller for imparting an arcuate oscillatory motion to each proximal end of said belts about the pivotally mounted ends as centers, whereby each proximal end traverses the forward face of the bale in an oscillatory arcuate path transverse to the path of movement of the bale, the amplitude of oscillation being at least sufficient to cause the proximal ends of the belts to traverse different halves of the face of the bale; and
    (k) belt driving means connected the distal rollers for continuously moving each belt and the spikes mounted thereon across the face of the bale simultaneously with the oscillatory motion.

2. The machine defined in claim 1 in combination with doffing means for removing plucked fibers from the spikes.

3. The machine defined in claim 2 wherein the belt driving means are also connected to the doffing means.

References Cited by the Examiner

UNITED STATES PATENTS 3,139,650   7/64   Diesel _____ 19—80 X

FOREIGN PATENTS 1,266,665   6/61   France.
838,793   6/60   Great Britain.

DONALD W. PARKER, *Primary Examiner.*

RUSSELL C. MADER, *Examiner.*